US010497273B2

(12) United States Patent
Chen et al.

(10) Patent No.: US 10,497,273 B2
(45) Date of Patent: Dec. 3, 2019

(54) METHOD AND SYSTEM FOR RECORDING AND PLAYBACK OF WEB-BASED INSTRUCTIONS (71) Applicant: SHENZHEN EAGLESOUL TECHNOLOGY CO., LTD., Shenzhen (CN)

(72) Inventors: Kengfan Chen, Shenzhen (CN); Jia Liu, Yuncheng (CN)

(73) Assignee: SHENZHEN EAGLESOUL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/567,938

(22) PCT Filed: Dec. 25, 2015

(86) PCT No.: PCT/CN2015/099055
§ 371 (c)(1),
(2) Date: Oct. 19, 2017

(87) PCT Pub. No.: WO2017/063287
PCT Pub. Date: Apr. 20, 2017

(65) Prior Publication Data
US 2018/0293906 A1 Oct. 11, 2018

(30) Foreign Application Priority Data

Oct. 15, 2015 (CN) .......................... 2015 1 0664607

(51) Int. Cl.
A63F 9/24 (2006.01)
G09B 5/06 (2006.01)
(Continued)

(52) U.S. Cl.
CPC ............... *G09B 5/065* (2013.01); *H04N 5/76* (2013.01); *H04N 21/231* (2013.01); *H04N 21/4788* (2013.01); *H04N 21/47217* (2013.01)

(58) Field of Classification Search
CPC .... H04N 21/4788; H04N 5/76; H04N 21/231; H04N 21/23109; H04N 21/47217; H04N 21/845; H04N 21/8547; G09B 5/065
See application file for complete search history.

(56) References Cited

U.S. PATENT DOCUMENTS

2002/0036694 A1* 3/2002 Merril ................ G02B 26/0816
348/220.1
2002/0054026 A1* 5/2002 Stevenson ............... G06F 3/038
345/173

(Continued)

Primary Examiner — Steve Rowland
(74) Attorney, Agent, or Firm — Patent Masters LLC (57) ABSTRACT The present disclosure provides effective recording and broadcasting method and system. The recording of function operation of using multimedia whiteboard, speech/speaking voice, communication voice for communication with other users and/or guiding etc. by user during network teaching or online conference is realized, and different data streams are formed respectively, the various data streams are labeled with unified time stamp created by network teaching system, which replaces completely recording the whole event in streaming media format. In this way, network users can conveniently download various data streams to be broadcasted from cloud server or local area network server through network anytime and anywhere, after acquiring data stream, client on user terminal reproduces the acquired data stream according to time stamp and organically combines them to broadcast and displays them to user, thereby finishing broadcasting on demand and browsing.

26 Claims, 7 Drawing Sheets (51) Int. Cl.
　　　*H04N 5/76* (2006.01)
　　　*H04N 21/231* (2011.01)
　　　*H04N 21/472* (2011.01)
　　　*H04N 21/4788* (2011.01)

(56) References Cited

U.S. PATENT DOCUMENTS

| | | | | |
|---|---|---|---|---|
| 2003/0234772 | A1* | 12/2003 | Zhang | G06Q 10/1095 345/177 |
| 2004/0165768 | A1* | 8/2004 | Zhang | H04L 29/06027 382/162 |
| 2004/0205477 | A1* | 10/2004 | Lin | G06F 16/40 715/202 |
| 2006/0182020 | A1* | 8/2006 | Factor | G06F 16/275 370/220 |
| 2007/0156816 | A1* | 7/2007 | Zhang | G06F 3/017 709/204 |
| 2007/0195159 | A1* | 8/2007 | Packer | H04N 7/147 348/14.12 |
| 2007/0198637 | A1* | 8/2007 | Deboy | H04L 65/4015 709/204 |
| 2008/0126943 | A1* | 5/2008 | Parasnis | G06Q 10/10 715/730 |
| 2008/0263010 | A1* | 10/2008 | Roychoudhuri | G11B 27/031 |
| 2009/0244278 | A1* | 10/2009 | Taneja | G06Q 10/10 348/143 |
| 2011/0288888 | A1* | 11/2011 | Gazula | G06Q 10/10 705/3 |
| 2014/0105563 | A1* | 4/2014 | Voorhees | G09B 5/02 386/224 |
| 2014/0162234 | A1* | 6/2014 | Ukelson | G09B 7/02 434/308 |

\* cited by examiner

Figure 5-1 schematic view of teaching system

Figure 5-2 schematic view of local recording and broadcasting system

Figure 5-3 schematic view of remote recording and broadcasting system

Figure 5-4 schematic view of VOD motion of recording and broadcasting system

METHOD AND SYSTEM FOR RECORDING AND PLAYBACK OF WEB-BASED INSTRUCTIONS

TECHNICAL FIELD

The present disclosure relates to a method, a system and a computer program product for recording and broadcasting of teaching activities or conference process based on the system such as network teaching or online conference, which realizes real-time recording and playback on demand of multimedia class or conference content during network teaching or online conference.

BACKGROUND

In recent years, with the popularization of mobile Internet and rapid development of network teaching system, the conventional teaching mode cannot meet user's requirements of teaching mode such as multimedia informatization to facilitate easy playback. During network teaching, excellent teaching resources can be shared on internet, and users can get online access to these resources by recording the teaching process via class recording and broadcasting, the requirement of review after class by students is also met.

Figure 1:
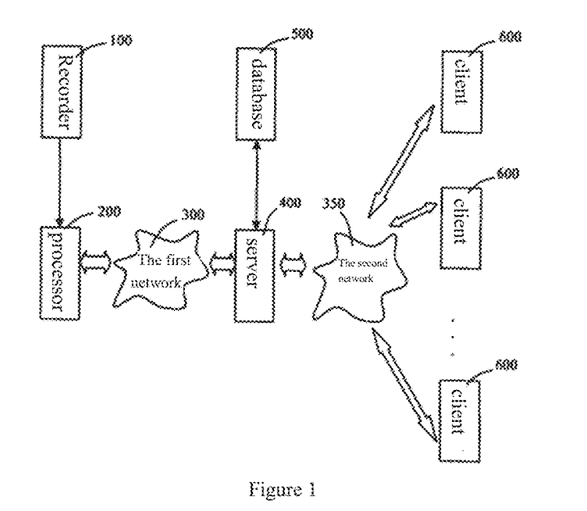
FIGS. 1 to 4 are schematic views of existing solutions.

As shown in FIG. 1, the existing document 1 (CN10114127 A, publication date 12 Mar. 2008) discloses a network teaching system, which comprises a recorder 100, a processor 200, a first network 300, a second network 350, a server 400, a database 500, and three clients 600, wherein, the recorder 100 mainly includes a camera (not shown in the figure) and a wireless digital microphone (not shown in the figure) for recording the video and audio information of a courseware. The first network 300 is used for transmitting the courseware information to the server 400. On the one hand, the server 400 is used for processing the courseware information further to create courseware data, on the other hand, the server 400 is used for searching and invoking the courseware data in the database 500 and converting the courseware data back into the courseware information. The database 500 is used for storing the courseware data. The second network 350 is used for connecting the client 600 and the server 400. The client 600 is used for facilitating user to inquire courseware information and invoking courseware information.

Figure 2:
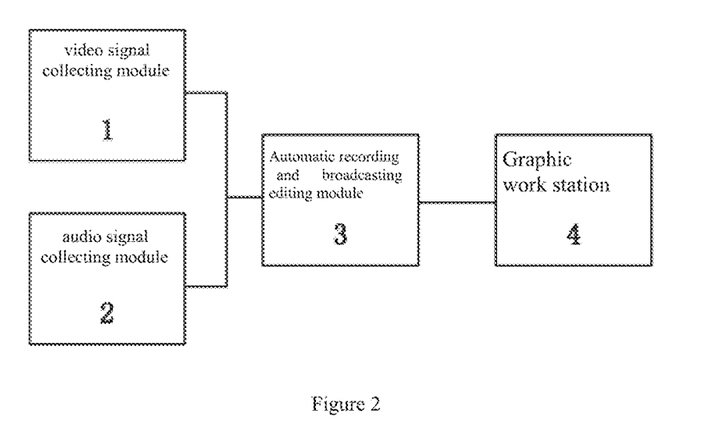

As shown in FIG. 2, the existing document 2 (CN103067683 A, publication date 24 Apr. 2013) discloses a full automatic recording and broadcasting system for distance teaching, which comprises an video signal collecting module 1 and an audio signal collecting module 2, an automatic recording and broadcasting editing module 3 and a graphic work station 4. The video signal collecting module 1 includes a teacher camera, a student camera and a blackboard writing camera for taking images of teacher, students and blackboard writing respectively, and all of these cameras adopt high speed spherical camera with rotation cradle head. When used, both the video signal collecting module 1 and the audio signal collecting module 2 are connected with the automatic recording and broadcasting editing module 3, and transmits the collected video and audio signals to the automatic recording and broadcasting editing module 3. The automatic recording and broadcasting editing module 3 is connected with the graphic work station 4 and edits the video and audio signals into an audio and video file, then the module transmits the file to the graphic work station 4. The graphic work station 4 compresses and codes the audio and video file for creating a streaming media file. No specially-assigned person is needed for operation and control during the whole process of teaching recording, and the streaming media file can be uploaded to internet.

Figure 3:
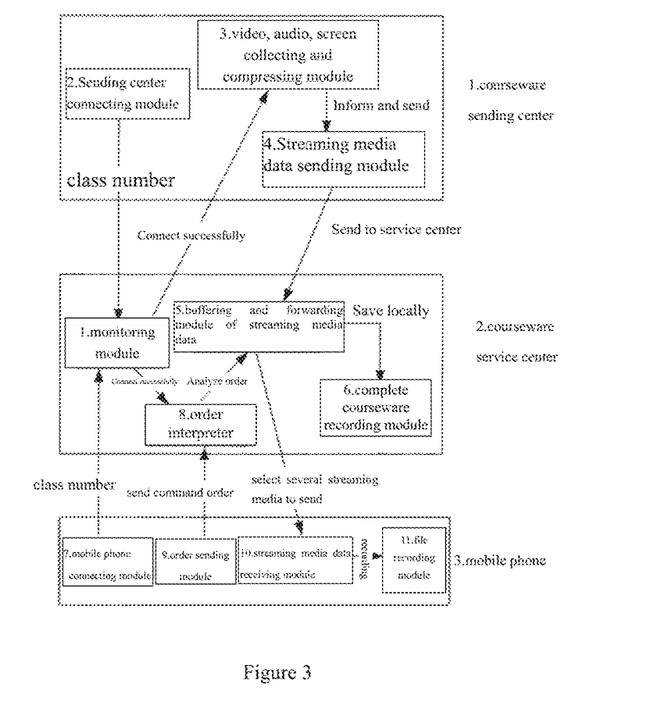

As shown in FIG. 3, the existing document 3 (CN101043469 A, publication date 26 Sep. 2007) discloses a method for recording personalized multimedia courseware via wireless internet with a mobile phone in a multimedia classroom, which is realized by the information interaction among a courseware service center, a courseware sending center and a mobile phone. The courseware service center has an external IP address and serves for all multimedia classrooms in a teaching building. The courseware sending center collects the screen signal of the teacher's teaching computer, the teacher's video and audio signal, and sends the screen, video and audio data to the service center after digitalization. The mobile phone is connected to the courseware service center via wireless network, and saves one or several streaming media data of them to mobile phone memory card when needed, and saves them as AVI document which can be watched directly on mobile phone or computer after finishing recording.

Figure 4:
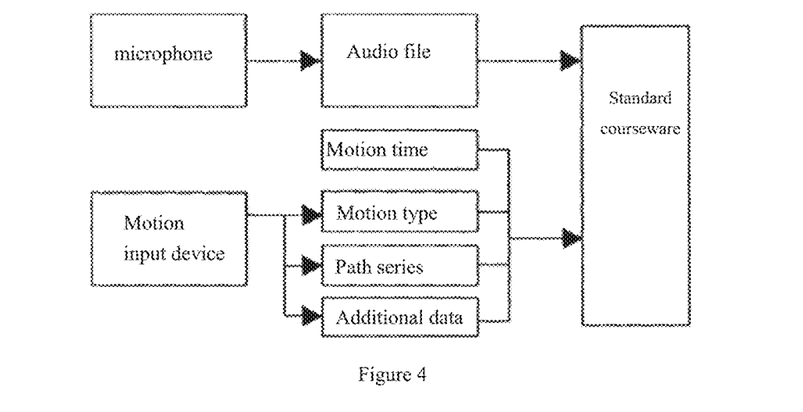

As shown in FIG. 4, the existing document 4 (CN103646573 A, publication date 19 Mar. 2014) discloses a method for creating special format file for a teaching system in panorama mode, the teaching system includes a panoramic courseware making system which acquires the motion, voice of teacher or interactive student, the class material and the time data corresponding to the time when these data are acquired. The motion includes inserting character or picture, demonstrating experiment process, drawing line, drawing geometric figure, eraser tool or small blackboard tool. The teaching system acquires the instant voice of teacher or interactive student with microphone, acquires the motion of teacher or interactive student on current system interface with mouse, keyboard, tablet or electronic whiteboard at the same time and conducts data analysis to the motion, acquires the time when the motion takes place, the path produced by the motion, the additional data carried by the motion and the data of motion type, and records in chronological order. The motion is divided into handwriting type, media type and data type, all of the handwriting type, media type and data type data include two parts: path part and data part, for the handwriting type motion, the path part completely records physical coordinate sequence of motion path, and the data part is not enabled; for the media motion, the path part records the coordinate of the multimedia file in the courseware, and the data part records the physical address of the multimedia file; for the data type motion, the path part records the coordinate of the data used in the courseware, and the data part writes complete binary data stream of the file.

The existing document 4 puts forward a lot of ideas, however, no specific way is given to realize them, and the document does not disclose separately acquiring and separately accessing various data in a systematic way, in particularly, it does not consider the idea that a unified timestamp is produced by the teaching system and various data streams are managed by unified timestamp and unified label of courseware.

In conclusion, the recording and broadcasting of the multimedia interactive teaching class in existing solutions mainly adopts the follow methods: 1 live recording and broadcasting streaming media on demand from network; 2 recording the class video with the camera hardware equipment on the spot; uploading it to the streaming media server, playing back on demand from network; 3 separately recording video and audio, broadcasting streaming media on demand from network; 4 recording by local screen capture at software client, and uploading it to server after finishing recording, playing back streaming media on demand from network; 5 simulating third party role server to record remotely, that is when starting a class, simulating a system role to achieve the remote recording and video file combination by server, playing back streaming media on demand from network.

In existing solutions, these methods for recording and broadcasting have the following disadvantages: 1 the recording process is cumbersome, some of them need a specially-assigned person to conduct live recording; 2 the video file is huge, file format is required to be transformed many times to reduce the file size at the cost of the courseware quality; 3 there is high requirement for storing system of server; 4 local recording requires high configuration and performance of the client apparatus, the uploading speed is slow, and it is difficult to play back; 5 a lot of server resource is consumed by simulating system role, the requirement of high concurrency network recording of class cannot be met; 6 there is high requirement for cluster performance of streaming media server for playing back on demand; 7 playing back on demand requires high server bandwidth; 8 playing back on demand requires high client's bandwidth (the file is too large); 9 when the video is watched with wireless internet such as 2G/3G/4G, there is heavy stuck, the video cannot be played smoothly, and it consumes high data traffic.

Furthermore, when user downloads the file to a local system and watches it, the file will occupy a large storage space, and the copyright of the teaching resource supplier cannot be protected, resulting in wanton spread of teaching resources. If the file is processed complexly with encryption, it will occupy the resources of network bandwidth and the resources of apparatus processor, affecting user experience.

In addition, the existing commercial software in existing solutions can record every operation on screen and save it as AVI or Microsoft Real Networks data stream format, however, it will also occupy a large storage space, and the data format it supplies is also streaming media.

For this purpose, an effective recording and broadcasting method and system is required to be provided, thus, the recording of function operation of using multimedia whiteboard, speech/speaking voice, communication voice for communication with other user and/or guiding etc. by user during network teaching or online conference is realized, and different data streams are formed respectively, which replaces recording the whole event in streaming media format. In this way, network users can conveniently order video to browse from cloud server or local area network server anytime and anywhere.

SUMMARY

It is important to note that although the implementation of the disclosure is described in the name of network teaching system or network conference system in the description, it is understood that the method and system in the present disclosure can be used for the recording and broadcasting of other network online communication process, that is to say, the present disclosure relates to a method, system, or computer program product for recording and broadcasting of teaching activities or conference process including network teaching, online training, emergency commanding (map labeling and audio recording), financial system or online conference system, and it realizes the real-time recording and playing back on demand of multimedia class or conference content during network teaching, online training, emergency commanding (map labeling and audio recording), financial system (stock operation explanation) or online conference.

To aforementioned problem, one aim of the present disclosure is providing a method for recording and broadcasting network teaching, it can realize recording, class reviewing or broadcasting on demand of network multimedia class, which includes real-time recording and saving of the motion on multimedia whiteboard (electronic whiteboard writing), displaying operation of electronic document, real-time dialogue audio and interactive communication audio, student users can fluently broadcast for review or on demand recorded file with network teaching system via wired or wireless local area network or wide area network, such as Bluetooth/2G/3G/4G/WIFI/LAN/WLAN.

According to one aim of present disclosure, it provides a method for recording and broadcasting network teaching, which comprises the following steps:

Starting recording a file;

Creating a file identity ID;

Collecting audio data from the first audio source, forming the first audio data stream;

Collecting audio data from at least one second audio source, forming the second audio data stream;

Collecting motion data from multimedia whiteboard, forming multimedia whiteboard motion data stream;

Collecting operation data from at least one screen display, forming screen display operation data stream, the screen display includes various application operations on the electronic document displayed on the screen;

Creating a time stamp identity;

Combing and binding the file identity ID and time stamp identity Timestamp with abovementioned data streams and the electronic document, and saving them to database according to set format respectively;

Acquiring these data streams via internet respectively by user terminal, broadcasting recorded content according to time identity Timestamp with client installed on the user terminal; wherein, the first audio source is teacher user of teaching activity, keynote speaker of online conference or main speaker of interactive communication activity; the second audio source is student user of teaching activity, other speaker of online conference or other speaker of interactive communication activity; the terminal is mobile terminal or wired fixed computer terminal; the network is wireless or wired local area network or wide area network. The database is local server database or internet server database.

When data stream is saved to local server database, it is uploaded to internet server database by local server database. The data stream is transmitted via Socket communication interface, and it is processed with SSL encryption. The method for recording and broadcasting network teaching further comprises:

Dividing at least one type of the data streams into segments, the identity ID of every data stream segment is composed of the file identity ID and segment code randomly assigned;

Establishing a mapping relationship table between the identity ID of data stream segment and the timestamp to combine the data stream segments in sequence according to the mapping relationship table, thereby realizing normal broadcasting of data stream.

The network teaching includes local network teaching, remote network teaching, local network online conference, remote network online conference, and other network online interaction and communication activities.

The multimedia whiteboard includes electronic whiteboard, touch input device or handwriting input device on which content can be written and data of the writing motion can be output.

The method for recording and broadcasting network teaching further comprises:

Acquiring coordinate parameter data of screen display on multimedia whiteboard, and saving them to the database.

The motion data includes coordinate position data of written content when writing on the multimedia whiteboard.

The electronic document includes WPS document, WORD document, PPT document, EXCEL document, PDF document, TXT document or image document;

The application operation includes opening, closing, page turning, forwarding, reverting of the electronic document and position information of labeling motion on the electronic document by user.

When executing the first broadcast request, server transfers data stream segments to user terminal according to the time sequence in mapping relationship table, user terminal can broadcast them by combing these segments in sequence, the mapping relationship table will not be sent to user terminal.

When executing broadcast request, whether the electronic document has been used will be checked according to the file identity ID of recorded file to be broadcasted. If the electronic document has been used, whether the electronic document has been downloaded will be checked first in local cache of user terminal, if the answer is yes, the document will not be downloaded, if the answer is no, the electronic document will be downloaded first to user terminal via network.

The broadcast request from network user is sent to system server through Socket encryption channel, system server acquires the data stream according to the file identity ID.

When data stream is divided into segments and recorded file cannot be broadcasted without mapping relationship table, if the data stream has been saved in local cache of network user terminal, recorded file can be restored and broadcasted just by downloading the mapping relationship table.

Valid time can be set for the mapping relationship table, such as 24 hours, or 48 hours, or any suitable authorized time. The timing module of network teaching system begins timing after the mapping relationship table has been downloaded to terminal, when time terminates, the mapping relationship table become invalid automatically, and the data in mapping relationship table will be deleted or shredded.

According to another aim of present disclosure, it provides a system for recording and broadcasting network teaching, which comprises a processor; and Computer readable storage medium, having computer readable medium code for performing operation by the processor, the operation includes:

Starting recording a file;

Creating a file identity ID;

Collecting audio data from the first audio source, forming the first audio data stream;

Collecting audio data from at least one second audio source; forming the second audio data stream;

Collecting motion data from multimedia whiteboard, forming multimedia whiteboard motion data stream;

Collecting operation data from at least one screen display, forming screen display operation data stream; the screen display includes various application operations on the electronic document displayed on the screen;

Creating a time stamp identity;

Combing and binding the file identity II) and time stamp identity Timestamp with abovementioned data streams and the electronic document, and saving them to database according to set format respectively;

Acquiring these data streams via internet respectively by user terminal, broadcasting recorded content according to time identity Timestamp with client installed on the user terminal, wherein, the first audio source is teacher user of teaching activity, keynote speaker of online conference or main speaker of interactive communication activity;

The second audio source is student user of teaching activity, other speaker of online conference or other speaker of interactive communication activity;

The terminal is mobile terminal or wired fixed computer terminal;

The network is wireless or wired local area network or wide area network.

The database is local server database or internet server database,

When data stream is saved to local server database; it is uploaded to internet server database by local server database.

The data stream is transmitted via Socket communication interface, and it is processed with SSL encryption.

The system for recording and broadcasting network teaching further comprises:

Dividing at least one type of the data streams into segments, the identity ID of every data stream segment is composed of the file identity II) and segment code randomly assigned;

Establishing a mapping relationship table between the identity ID of data stream segment and the timestamp to combine the data stream segments in sequence according to the mapping relationship table, thereby realizing normal broadcasting of data stream.

The network teaching includes local network teaching, remote network teaching, local network online conference, remote network online conference, and other network online interaction and communication activities.

The multimedia whiteboard includes electronic whiteboard, touch input device or handwriting input device on which content can be written and data of the writing motion can be output.

The system for recording and broadcasting network teaching further comprises:

Acquiring coordinate parameter data of screen display on multimedia whiteboard, and saving them to the database.

The motion data includes coordinate position data of written content when writing on the multimedia whiteboard.

The electronic document includes WPS document, WORD document, PPT document, EXCEL document, PDF document, TXT document or image document;

The application operation includes opening, closing, page turning, forwarding, reverting of the electronic document and position information of labeling motion on the electronic document by user.

When executing the first broadcast request, server transfers data stream segments to user terminal according to the time sequence in mapping relationship table, user terminal can broadcast them by combing these segments in sequence, the mapping relationship table will not be sent to user terminal.

When executing broadcast request, whether the electronic document has been used will be checked according to the file identity ID of recorded file to be broadcasted. If the electronic document has been used, whether the electronic document has been downloaded will be checked first in local cache of user terminal, if the answer is yes, the document will not be downloaded, if the answer is no, the electronic document will be downloaded first to user terminal via network.

The broadcast request from network user is sent to system server through Socket encryption channel, system server acquires the data stream according to the file identity ID.

When data stream is divided into segments and recorded file cannot be broadcasted without mapping relationship table, if the data stream has been saved in local cache of network user terminal, recorded file can be restored and broadcasted just by downloading the mapping relationship table.

Valid time can be set for the mapping relationship table, such as 24 hours, or 48 hours, or any suitable authorized time. The timing module of network teaching system begins timing after the mapping relationship table has been downloaded to terminal, when time terminates, the mapping relationship table becomes invalid automatically, and the data in mapping relationship table will be deleted or shredded.

According to another aim of present disclosure, it provides a computer program, which comprises computer program code uploaded to a computer system and performing steps of aforementioned method when executed.

According to another aim of present disclosure, it provides a computer readable medium, which includes aforementioned computer program.

With the method and system in present disclosure, the process for recording class is made easier, the process for explaining electronic whiteboard handwriting and real-time voice stream can be automatically recorded and saved respectively. There is no high requirement for the performance of user terminal and server, the mainstream configuration at present can satisfy the requirement, and no extra high performance equipment is needed, the problem of resolution and frame frequency is not required to be considered. The explaining image and audio are recorded in real time and synchronously. The bandwidth of 5-10 kB/s can meet the requirement of uploading recorded data. All data are stored to database, thereby making it safer and more convenient to use. All the class is stored to database in the form of data stream, the storage space is reduced to one percent of that in existing solutions. There is low bandwidth requirement for playing back on demand, ordinary network can realize fluent playing back on demand through network.

The following detailed description with combination of the appended drawing will make the aforementioned and further aims and features of the present application clearer and more complete.

BRIEF DESCRIPTION OF THE DRAWINGS

The embodiments will be more readily understood in view of the following description when accompanied by the below figures and wherein like reference numerals represent like elements, wherein:

FIGS. 5-1 to 5-4 are schematic views of network topologic structure used in the network teaching system according to the present disclosure and schematic views under various conditions.

FIGS. 7-1 to 7-2 are schematic views of the process for acquiring path coordinate data with the recording and broadcasting system according to the present disclosure;

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

The embodiments will be described detailed in further with the combination of the appending drawings.

The network teaching in the present disclosure is not limited to student-teacher form, it may include online network teaching, remote network teaching, local network teaching participating by teacher user, student user or trained user and online network conference, remote network conference, local network conference participating by participants such as staffs in enterprise and public institution and other online communication through network and/or communication/interactive forms by displaying file content, such as remote collaborative work.

FIGS. 5-1 to 5-4 are schematic views of network topologic structure used in the network teaching system according to the present disclosure and schematic views under various conditions.

As shown in FIGS. 5-1 to 5-4, teacher user 1, student user 2 are connected to remote teaching server 3 through network, thereby realizing giving a lecture/attending a lecture/recording through network in multimedia class. The network teaching platform or network teaching system named in the present disclosure comprises user terminals 1, 2, a server 3, and network for providing communication service between them.

Attending a lecture: a teacher may start a class by connecting PC(Win\Mac)\Pad(Android\iOS)\ Phone (Android\iOS) to a server through 2G/3G/4G/blue tooth etc. whenever and wherever possible, a student may join a class by connecting PC(Win\Mac)\Pad(Android\iOS)\ Phone (Android\iOS) to the server through 2G/3G/4G/blue tooth etc. whenever and wherever possible. The motion data stream \+audio data stream of giving a lecture by a teacher are sent separately through the server, and a student acquires motion data stream and audio data stream corresponding to class in real time, thereby realizing attending lecture and interacting online in real time.

Recording: a teacher may start a class by connecting PC(Win\Mac)\ Pad(Android\iOS)\ Phone(Android\iOS) to a server through 2G/3G/4G/blue tooth etc. whenever and wherever possible, a teacher encrypts motion data stream—audio data stream during teaching and saves them to DB server in real time, thereby realizing storage (recording) of motion data stream such as multimedia whiteboard, word, PPT and audio data stream during class explanation.

Broadcasting on demand/playing back: a student may connect PC(Win\Mac)\ Pad(Android\i\OS)\ Phone (Android\iOS) to a server through 2G/3G/4G/blue tooth etc. whenever and wherever possible. When broadcasting (playing back) a class on demand, a student may quickly acquire corresponding motion data stream and audio data stream according to corresponding Class ID and label, thereby realizing quick and fluent broadcasting on demand/playing back.

The user terminal includes a processor a network module, a control module, a display module and an intelligent operation system; various data interfaces may be provided on the user terminal for connecting various extended devices and accessories through data bus; the intelligent operation system includes operation platform such as Windows, Android and improvement thereof, iOS. Application software can be installed and run on the platform, thereby realizing the function of various application software, service and App store under the intelligent operation system.

The user terminal may connect to internet through network connection manner such as RJ 45/WI-FI/Bluetooth/2G/3G/4G/G. hn/Zigbee/Z-ware/BFID and connect to other terminal or other computer and device through internet, and it can connect to various extended device and accessories through various data interfaces or buses such as 1394/USB/serial/SATA/SCSI/PCI-E/Thunderbolt/data card interface and audio-video interface such as HDMI/YpbPr/SPDIF/AV/DVI/VGA/TRS/SCART/Display port, thereby forming a conference/teaching equipment interactive platform system. The sound control and shape control function is realized by a sound capture control module and a motion capture control module with software form or by a sound capture control module and a motion capture control module with the form of hardware on data bus plate; the function of display, projection, sound connection, audio-video broadcasting and the digital or simulated audio-video input and output is realized by connecting a display/projection module, a microphone, a sound equipment and other audio-video device through audio-video interface; the function of image connection, sound connection, use control of electronic whiteboard and screen recording, RFID reading can be realized by connecting a camera, a microphone, an electronic whiteboard, a RFID read device through data interface, a mobile storage device, a digital device and other device can be connected and controlled through corresponding interface; the function of control, interaction and screen jilting among multi-screen devices is realized by DLNA/IGRS technology and internet technology.

In the present disclosure, the processor is defined as including but not limiting to an instruction execution system, such as computer/processor based system, a special integrated circuit (ASIC), a computing device, or a hardware and/or a software system which can get or acquire logic from a non-temporary storage medium or a non-temporary computer readable storage media and execute instruction included in the non-temporary storage medium or the non-temporary computer readable storage media. The processor also includes any controller, state machine, micro-processor, entity, service or features based on internet, or any other simulated, digital and/or mechanical realization approaches thereof.

In the present disclosure, the computer readable storage media is defined as including but not limiting to: any media which can contain, store or keep program, information, and data. Computer readable storage media includes any one of many physical media, such as electronic media, magnetic media, optical media, electromagnetic media or semiconductor. The more concrete example of suitable storage used for computer readable storage media, user terminal and server includes but not limits to: magnetic computer disk (for example soft disk or hard disk), tape, random access memory (RAM), read-only memory (ROM), Erasable Programmable Read-Only-Memory (EPROM), compact disk (CD) or Digital Video Disk (DVD), blue-ray storage, solid state disk (SSD), flash memory.

In the present disclosure, internet is divided into local area network and wide area network, it may be wired internet, wireless internet, or any combination thereof. Recording may be recorded locally or through local area network and then uploaded to background server, the main body of recording should be teacher user terminal or student terminal with permission. The record may be saved to user terminal with certain permission after being recorded.

Figure 6:
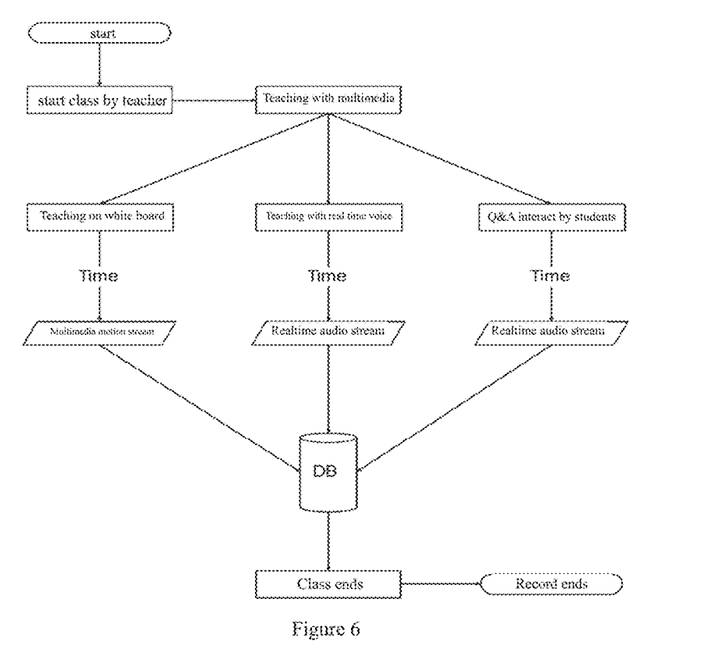
FIG. 6 is a schematic view of the process for real-time class recording with the recording and broadcasting system according to the present disclosure.

FIG. 6 is a schematic view of the process for real-time class recording with the recording and broadcasting system according to the present disclosure.

As seen in FIG. 6, the recording process and manner of network teaching process in the present disclosure are as follows: a teacher user starts a class with network teaching system, displays with an intelligent electronic whiteboard (as teaching handwriting or explaining board), explains with real time voice, communicates with real time interactive voice, teacher user can also display and explain with an electronic document, for example PPT, thereby giving a lecture with multimedia and interacting with student users by a question-and-answer communication. The motion on the intelligent electronic whiteboard during teaching process will form a "motion data stream+time stamp label" pattern and is saved to database, the real-time voice during interactive and teaching process will form a "audio data stream+time stamp label" pattern and is saved to database, wherein during interactive process the audio data stream, especially the audio from student user, may be recorded on site in real time, or it can be acquired through remote network, all of these audio data stream may be saved to database in the form of "audio data stream+time stamp label" separately. If the operation of electronic document, such as PPT, is related, it can be saved to database in the form of "electronic document operation data stream+time stamp label". All of the data streams during the whole teaching process is bound with class identity (Class ID) thereby realizing recording of corresponding class, the recording finishes while the class end.

Motion data stream+time stamp: the motion data steam is encrypted during the process of transfer, and it is converted into string type and saved to database, the motion data steam, time stamp, class ID, and subject ID form mapping relation, thereby facilitating reading data quickly to realize broadcast on demand/review. The advantages are as follows: the pressure of database is relieved, the data will be smaller (calculated by byte) when the motion data steam is stored in the form of string. A server or many servers may be arranged separately to realize distributed storage. The server adopts multithreading processing, and the response speed is quicker. The corresponding motion data stream can be quickly acquired through corresponding Class ID and label after getting mapping relation. In this way, even when the network is very bad, the broadcasting on demand/review is still quick and fluent.

Audio data stream+time stamp: the audio data steam is compressed and coded and decoded during the process of transfer, and the audio of every class is stored to file path corresponding to disk array independently, the database maps Class ID, time stamp, audio ID, audio stream storage path with means such as ID, and realizes mapping of audio stream relation and acquiring of data for broadcasting on demand/review. The advantages are as follows: the pressure of database is relieved, the storage pressure of storage disk is relieved by compressing audio and distributed storage of audio stream. The server adopts multithreading processing, and the response speed of the server is quicker. The corresponding audio data stream can be quickly acquired through corresponding Class ID and label after getting mapping relation. In this way, the broadcast on demand/review is quicker and more fluent.

Student user preferably pre-downloads the electronic documents used by teacher user or other teaching material used by teacher user. When teacher uses these documents, the data of all operation motion and label information will be transmitted to student user terminal, making the student user terminal display the same operation motion as that on teacher terminal without transmitting the image information displayed on teacher terminal.

For the content described on teacher terminal, such as handwriting, the path coordinate data of electronic whiteboard or courseware (Word\PPT\PDF) explanation is recorded with client or APP on teacher user terminal, for the whole interface of electronic whiteboard or courseware explanation, the image position is calculated in the manner of coordinate point, and every point has different coordinate information. The process of acquiring is as follows: every drawing or labeling or circling etc. starts from the first coordinate point of whiteboard and ends at the last coordinate point where this motion ends, which is saved as a segment of motion instruction data. After the student user terminal acquires these path coordinate data, the terminal can redraw the coordinate with instructions and realize redisplay without acquiring the whole displayed image information.

Figure 71:
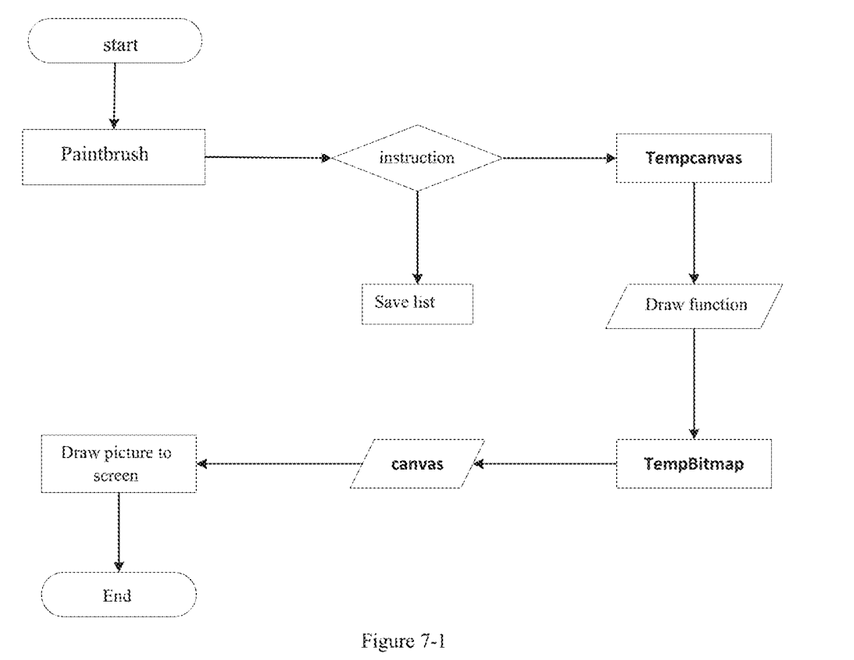
Figure 72:
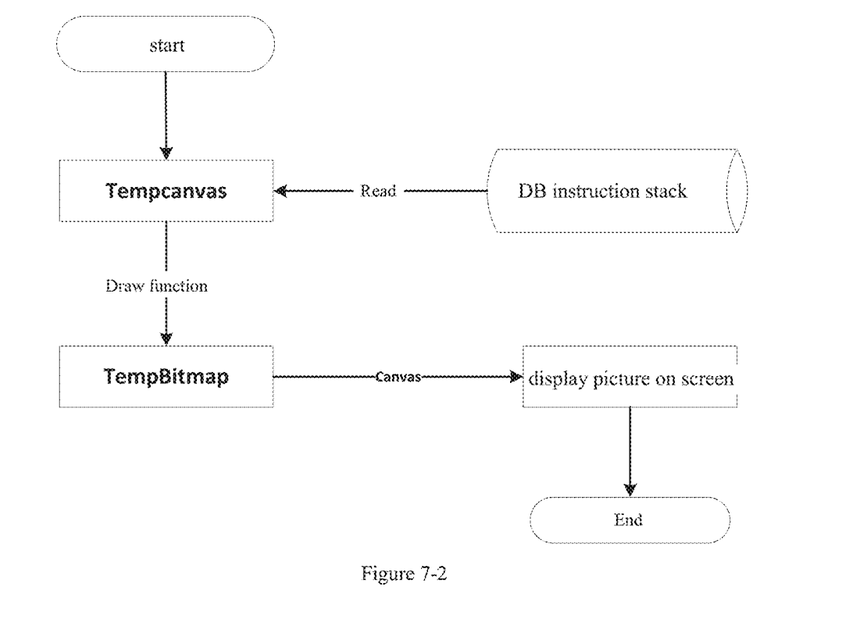

FIGS. 7-1 to 7-2 are schematic views of the process for acquiring path coordinate data with the recording and broadcasting system according to the present disclosure.

As seen from FIGS. 7-1 to 7-2, the process for recording the path coordinate data is as follows:

A1 analyzing the recorded path coordinate data, and saving it to temporary instruction coordinate stack, then setting up the screen initially, setting background pattern on the canvas of the screen firstly;

//If the path is made by brush, the current record path is saved to the list this.mPathPaintlist.add(this.mPath-Paint);
//saving the brush and path resume PathAndPaint pap=new PathAndPaint( );
pap.setPath(new Path(this.mPath));
pap.setPaint(new Paint(this.mPaint));
this.mPathAndPaintlist.add(pap);

A2 setting up Bitmap, and creating a temporary canvas temptCanvas with this Bitmap;

A3 setting the background of tempBitmap transparent, the purpose of which is positioning the object of temporary canvas temptCanvas on the new set tempBitmap;

A4 after constructing like this, retrieving coordinate instruction of instruction stack, restoring it one by one, rewriting it with temptCanvas, all draw function of tempt-Canvas will draw corresponding image on temporary temp-Bitmap, in this way, during the process of reconstructing motion, drawing point, drawing line by invoking temptCanvas without invoking canvas on original screen, such as temptCanvas. drawPoint, temptCanvasRect and so on;

A5 after executing all instruction coordinate stack, executing canvas.drawBitmap (tempBitmap,0,0,null); temptCanvas is responsible for drawing various brush marks on tempBitmap, while canvas is responsible for drawing tempBitmap on screen.

The logic steps of the motion drawing are as follows, wherein parameters (float x,float y) described by touchMove are coordinate on transverse axis or longitudinal axis:

```
private void touchMove(float x,float y) {
    if(null != this.mPathPaint){
        float dx = Math.abs(x - this.mPreviousX);
        float dy = Math.abs(y - this.mPreviousY);
        //if the distance between two points is greater than or equal to 3, creating Bezier drawing curve
        if((dx >= DEFAULT_TOUCH_TOLERANCE) || (dy >= DEFAULT_TOUCH_TOLERANCE)){
            //setting operation point of Bezier curve as half of starting point and terminal point
            float cX = (this.mPreviousX + x) / 2.0F;
            float cY = (this.mPreviousY + y) / 2.0F;
            //twice Bezier, realizing smooth curve: previousX, previousY are operation point, cX,cY are terminal point
            this.mPath.quadTo(this.mPreviousX,this.mPreviousY,cX,cY);
            if (!isEraser( )){
                this.mCanvas.drawPath(this.mPath,this.mPaint);
            }
            //when executed for the second time, the coordinate value invoked at the end of first execution will be the initial coordinate value for the second invoke
```

```
    this.mPreviousX = x;
    this.mPreviousY = y;
    this.mPathPaint.addPathPoint(x,y);
      }
     }
  }
}
```

Figure 8:
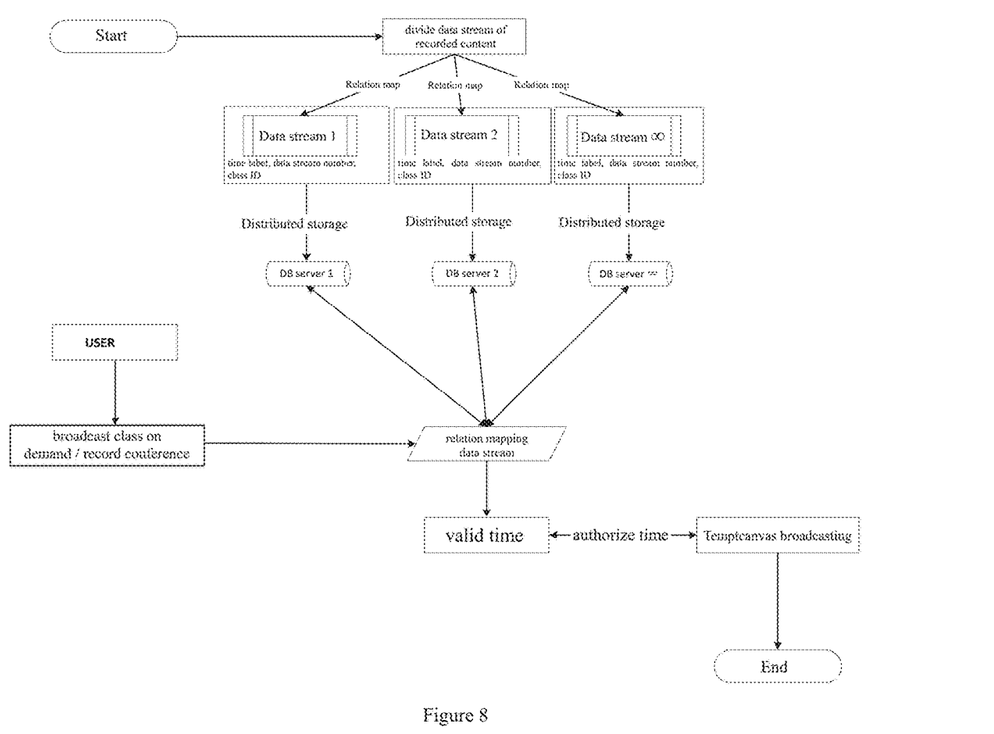
FIG. 8 is a schematic view of dividing data segments with the recording and broadcasting system according to the present disclosure.

FIG. 8 is a schematic view of dividing data segments with the recording and broadcasting system according to the present disclosure.

As seen in FIG. 8, to meet the requirement of copyright protection or secrecy without affecting the user experience too much, a manner with low cost while playing a role in secrecy can also be used.

At least one of the all data streams is divided into data stream segments, these data stream segments can be labeled with class identity and code created at random, the data stream can be divided correspondingly referring to or according to creation status of time stamp labelling. After dividing data stream, the mapping relation table between these data stream segments and time stamp label is formed and saved to database. When broadcasting these recorded class on demand for the first time, these data stream segments will be transmitted to VOD user terminal in sequence according to mapping relation table, making the user terminal can broadcast these data streams in sequence and display the recorded class properly. When saved to the location of user terminal, these data stream segments are in disorder, and mapping relation table is required to properly broadcast these segments in sequence.

That is to say, the ID of video stream segments or audio stream segments is coded in random, these coding and time stamp form relation mapping table, when user browses a class, both video segments and audio segments are downloaded to the local, but they cannot be broadcasted in sequence, after user browsed the class for the first time, only if the cache is not emptied, the user can browse it by only re-downloading relation mapping table for the next time. Every time the data in the relation mapping table is read, it will automatically synchronize with the local time after a predetermined time, thereby losing mapping and achieving the purpose of copyright protection without affecting user experience. Optionally, valid time can be set for the mapping relation table, for example 24 hours, or 48 hours, or any suitable legal authorized time. After downloading the mapping relation table to the terminal, the timing module of the network system begins timing, the mapping relation table will fail automatically when time terminates, and the data in mapping relation table will be deleted or smashed.

The real-time class can be recorded at user terminal with permission, such as teacher user terminal or student terminal authorized, the data stream acquired by recording can be saved to local database or terminal database, then it will be uploaded to network server through network by these databases, and it can be saved to remote network server directly.

Figure 9:
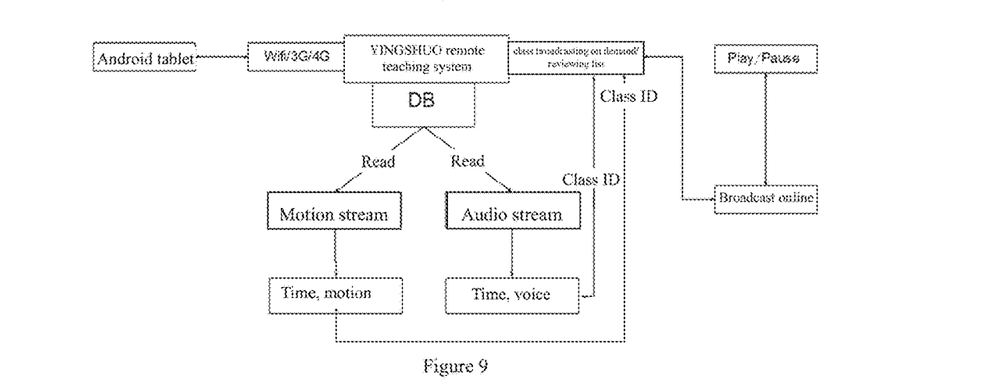
FIG. 9 is a schematic view of playing back class on demand with the recording and broadcasting system according to the present disclosure.

FIG. 9 is a schematic view of playing back class on demand with the recording and broadcasting system according to the present disclosure.

As seen in FIG. 9, the manner for realizing the broadcasting on demand or review of recorded class is as follows: connecting WIFI/2G/3G/4G network with Android tablet computer or intelligent mobile to log in the network teaching system, broadcasting the recorded class with the class VOD or review list; broadcasting corresponding class on demand to acquire class identity (Class ID), connecting the database of network teaching system, acquiring such data as the motion stream, audio stream corresponding to class identity (Class ID) and various files the class may use, such as electronic document, downloading these electronic document material to the local, realizing the broadcasting on demand and review of recorded class, the process of review support pause, broadcasting, and termination.

The storage of various data stream are separate and independent to each other, and the process to acquire and download the stream are independent to each other. It is possible to download corresponding data according to requirement, for example, if user thinks only audio data is needed to be downloaded while other data are not needed to be transmitted, the user can only acquire expected data through client terminal instruction from user terminal and broadcast it especially in the condition of bad network status.

Figure 10:
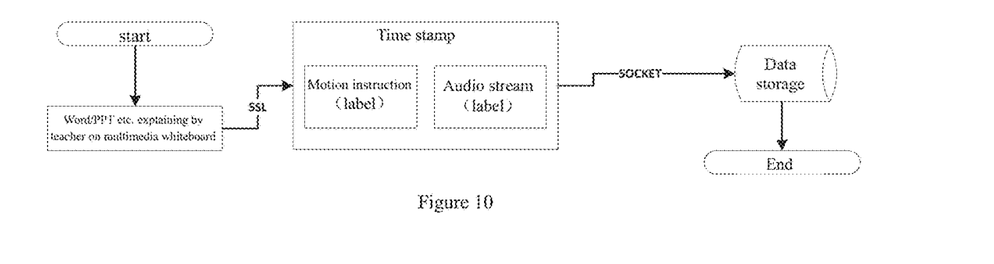
FIG. 10 is allow schematic view of class recording with the recording and broadcasting system according to the present disclosure.

FIG. 10 is a flow schematic view of class recording with the recording and broadcasting system according to the present disclosure.

As seen in FIG. 10, this embodiment adopts for stream socket communication mode. Socket is one end of two way communication between two programs run on internet, it can both receive request and send request, it belongs to frequently-used communication mode for network physical level, socket is generally composed of IP address and port number. The frequently used socket has two types: one is stream socket, and the other is datagram socket. Stream socket is connection-oriented socket and is applied for connection-oriented TCP service. The class is recorded with timestamp identity+motion type ID+motion content data.

For example: 1) If a circle is drawn on whiteboard, it will be recorded: 14209372114 (time stamp)+type: 11 (the label of drawing circle)+center coordinate and radius (content data), the record is sent to server terminal with Socket to save, and then it is distributed to other users of class by the server.

For example: 2) If a line is drawn or a formula is written with a brush, it will be recorded: polygon: 14209372114 (time stamp)+type: 2 (drawing type)+array coordinate of polygon vertex (content data), the record is sent to server terminal with Socket to save, and then it is distributed to other users of class by the server.

For example: 3) If a line is drawn or a formula is written with a brush, it will be recorded: brush: 14209372114 (time stamp)+type: 3 (drawing type)+the finger drawing path point coordinate (content data), the record is sent to server terminal with Socket to save, and then it is distributed to other users of class by the server.

For example: 4) line: 14209372114 (time stamp) type: 4 (drawing type)+coordinate of two points of line (content data), the record is sent to server terminal with Socket to save, and then it is distributed to other users of class by the server.

For example: 5) re-drawing: 14209372114 (time stamp)+type: 5 (drawing type).

For example: 6) clearing: 14209372114 (time stamp)+ type: 6 (drawing type).

This manner can be applied to such records as explaining the exercise on whiteboard, switching the subject, character emoticon information and voice message by the teacher user in the class.

In addition, the motion information created by the operation of electronic whiteboard includes any one of the following motion information: the motion information of any one of drawing straight line, rectangle, circle or broken line on the electronic white board, or the motion information of erase operation with eraser tool on the electronic white board, or the motion information of loading picture or geometric figure on the electronic white board, or the motion information of newly built a page or paging up and down on the electronic white board.

Teacher user terminal labels and explains with real time voice on a multimedia whiteboard (electronic whiteboard, PPT document operation etc.), the system encrypts with SSI (Security Socket Layer) through Socket communication interface, and it transmits the timestamp identity Timestamp, multimedia whiteboard motion stream identity Type and real time voice Audio to the system sever database in real time, the system definitely defines the data storage format, and the timestamp, motion stream and real time voice is stored to server database and server storage unit in real time according to fixed data storage format, thereby achieving real time class recording.

The recorded stream, for example the real time audio data stream of teacher lecture, can be divided into segments according to creating period of time stamp, for instance, the stream is divided into one segment every 10 seconds or 30 seconds. These data stream segments are combined and named with class ID and random code, and a mapping relation table between data stream segment name and time stamp is constructed.

Figure 11:
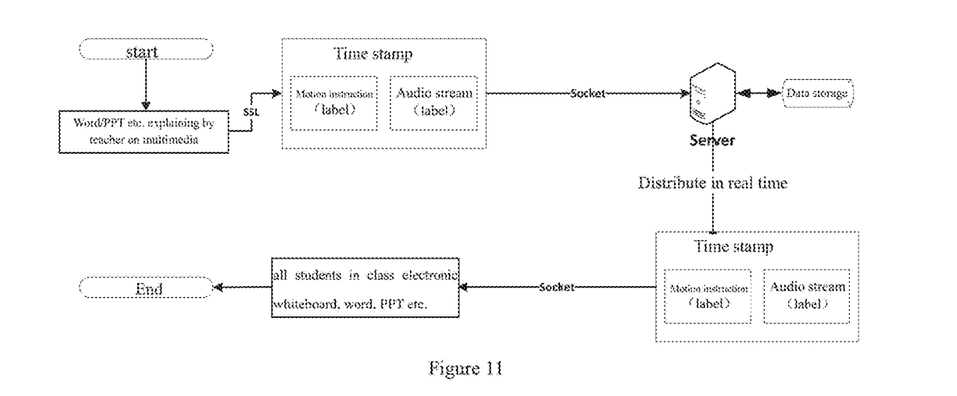
FIG. 11 is a schematic view showing realizing one-to-many real-time class with the recording and broadcasting system according to the present disclosure.

FIG. 11 is a schematic view showing realizing one-to-many real-time class with the recording and broadcasting system according to the present disclosure.

As seen in FIG. 11, multiple teacher users begin class with the network teaching recording and broadcasting system platform of the present disclosure. A class ID is defined for every class, the system is connected with Socket communication interface, and the communication process is encrypted with SSI, and the system transmits the timestamp identity Timestamp, multimedia whiteboard such as electronic whiteboard motion stream identity Type and real time voice Audio to the system sever database in real time, the service logic processing of Server distributes the motion stream, audio stream in real time, for the class ID, the processing sends the motion stream and audio stream corresponding to class ID to all students users of the class, achieving the remote real time class function.

If the teacher user uses the electronic document, for example PPT document, during class, then student users can connect to internet to download relevant documents before class or the network teaching system pushes relevant documents to student user terminals before class. If the teacher operates the electronic documents, for example, opening PPT, turning page, etc, these operation motion streams will be combined with ID of the PPT document, saved to server, and sent to corresponding student users, thereby displaying the same operation as teacher's on student terminal.

Figure 12:
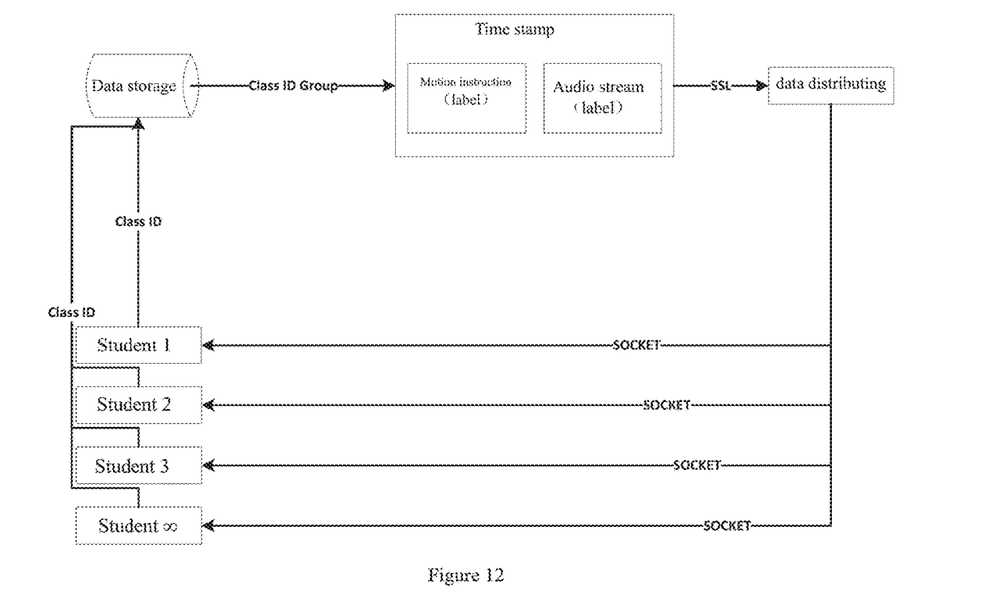
FIG. 12 is a schematic view showing realizing class playback on demand with the recording and broadcasting system according to the present disclosure.
Figure 51:
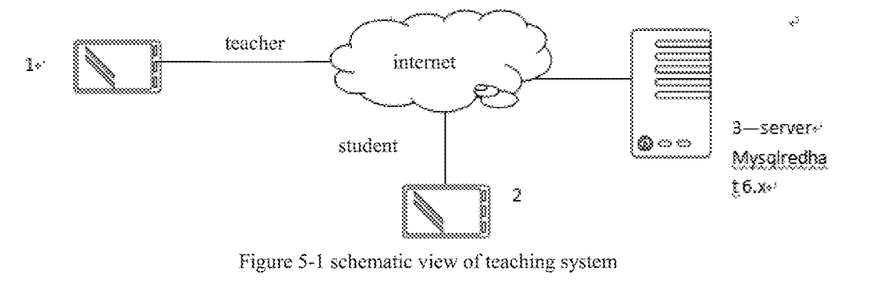
Figure 52:
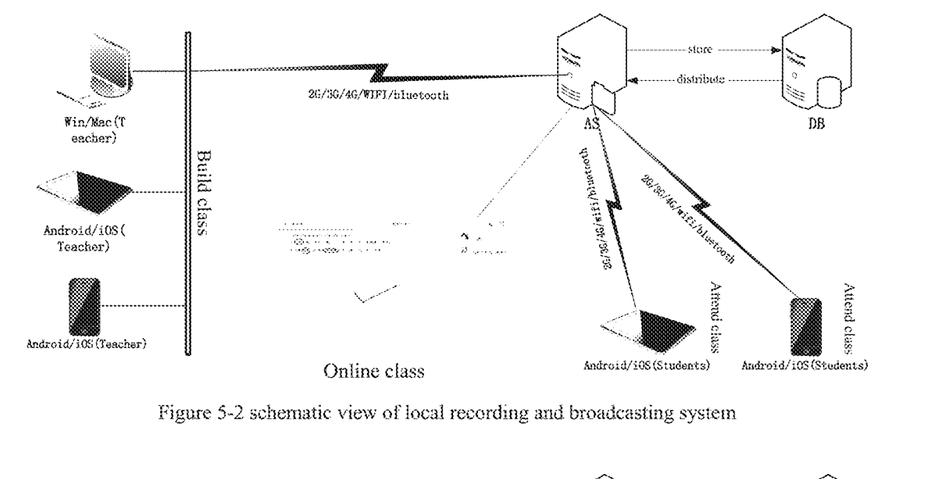
Figure 53:
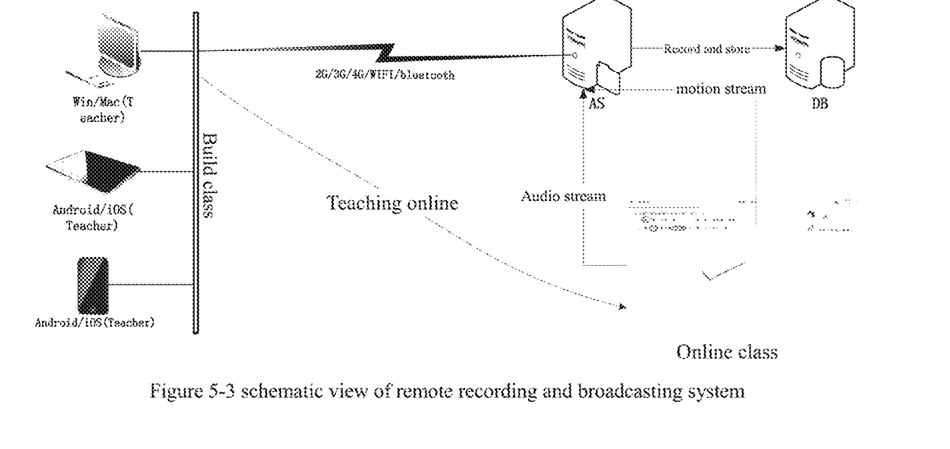
Figure 54:
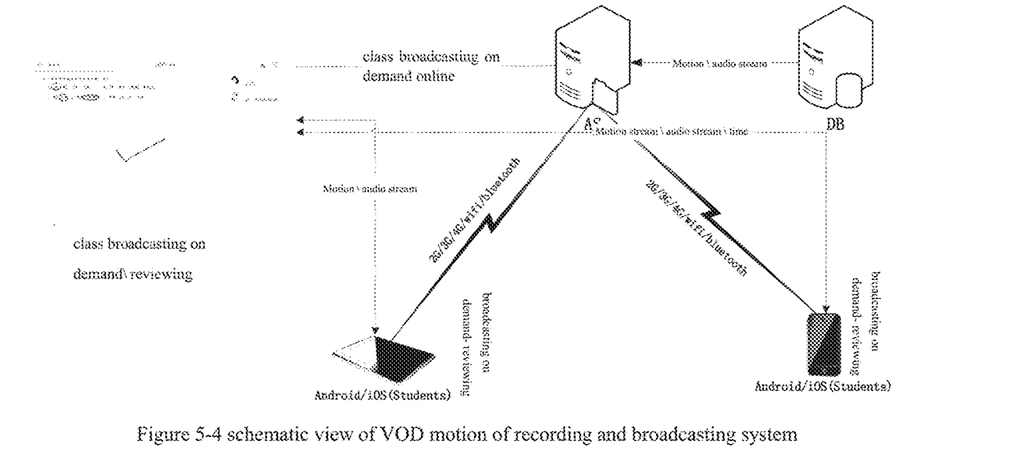

FIG. 12 is a schematic view showing realizing class playback on demand with the recording and broadcasting system according to the present disclosure.

As seen in FIG. 12, all student users (student 1, student 2 . . . ) can review and broadcast the historical class on demand. When the available class is broadcasted on demand, of class, for other users such as network online conference users, the available class may be process record document of network online conference, every student user sends the identity ID of the class to be reviewed or broadcasted on demand, the network teaching system may send the class ID sent by students to server through socket encrypted channel, the server acquires the motion data stream, audio data stream, and electronic document operation data stream under every time stamp identity of the class through Class ID and sends them to student user requesting corresponding class ID, the student user restores the explaining process of the whole class locally with the terminal.

To meet the requirement of copyright protection or secrecy without affecting the user experience too much, a manner with low cost while playing a role in secrecy can be used. At least one of the data stream is divided into data stream segments, for instance, the processed voice data stream is divided into segments, these data stream segments can be labeled with class identity and code created at random, the data stream can be divided correspondingly referring to or according to creation status of time stamp labeling. When broadcasting these recorded classes on demand for the first time, the system server transmits these data stream segments according to time sequence, making the users can review in sequence and fluently. When these data streams are saved to local cache, if the user reviews it again, the user should send a request to server to download the mapping relation table between these data stream segments and time stamp identity, in this way, these data streams can be broadcasted normally.

In above mentioned embodiment, the user terminal and server may be constitution connectable to communication network including internet, so they can be media hosting program code in the manner of downloading program code via communication network, Under the situation of downloading program code from communication network, the user terminal and server can also be constitution that the program to be downloaded is pre-saved in main device or installed from other record media. Furthermore, the present disclosure can be realized by presenting above mentioned program code in the manner of computer data signal embodied in electronic transmit and embedded in carrier wave.

The differences between the present disclosure and the recording method in existing solutions are as follows: the present disclosure is different from the recording of video stream, it mainly records and transmits coordinate triggering data created by motion/operation, and restores class content with triggering data by other user terminals in real time or restores class content with triggering data during post broadcast on demand, and the present disclosure has the features of small storing and transmitting data stream. In particular, during the teaching process, if there is idle time, no data will be sent, or only audio data stream is sent, thereby enhancing transmitting efficiency to the most extent.

On the basis of existing solutions, the present disclosure provides a systemic and reliable teaching recording and broadcasting method, in the method the data are recorded and saved separately according to category, and then a unified time stamp is created to label the data, the data requiring encryption is divided simply, and a mapping relation table is established. The recorded data can be acquired separately according to requirement, thereby realizing fluent data transmission. These data can be combined organically on the client terminal of local terminal. Even only parts of data are acquired to broadcast according to the requirement of client. In this way, the present disclosure solves the problem of teaching recording and broadcasting systemically.

The present disclosure has the feature of across platforms: the present disclosure defines a clear data storage format, restoring format, all data of process document recording and document reviewing are acquired from database in the manner of time stamp identity+motion data stream +audio data stream, thereby realizing the restoring of teaching handwriting and teaching voice as examples during network online communication process. The present disclosure supports operation system such as Android\IOS\Windows, and it has very good ability of displaying across platforms and is convenient and quick to expand to other displaying platforms.

The foregoing description relates to the preferred embodiments of the present disclosure, it is intended to make the spirit of the present disclosure clearer and easier to understand, but not to limit the present disclosure. Any modifications, equivalent variations, and improvements within the spirit and principles of the present disclosure should fall into the scope of the appended claims.

What is claimed is:

1. A method for recording and broadcasting network teaching, the method comprising:
   starting recording a file;
   creating a file identity identifier (ID);
   collecting audio data from a first audio source to form a first audio data stream;
   collecting audio data from one or more second audio sources to form a second audio data stream;
   collecting motion data from a multimedia whiteboard to form a multimedia whiteboard motion data stream;
   collecting operation data from at least one screen display to form a screen display operation data stream, the at least one screen display including various application operations on an electronic document displayed on the at least one screen display;
   creating a time stamp identity;
   creating a set of files by combing and binding the file identity ID and the time stamp identity with the first audio data stream, the second audio data stream, the multimedia whiteboard motion data stream, the screen display operation data stream, and the electronic document;
   storing the set of files in a database according to respective formats;
   acquiring the first audio data stream, the second audio data stream, the multimedia whiteboard motion data stream, and the screen display operation data stream via internet respectively by a user terminal;
   broadcasting recorded content according to time stamp identity with client installed on the user terminal following the acquiring;
   dividing at least one type of the first audio data stream, the second audio data stream, the multimedia whiteboard motion data stream, and the screen display operation data stream into segments, wherein the identity ID of every data stream segment is composed of the file identity ID and segment code randomly assigned; and
   establishing a mapping relationship table between the identity ID of the data stream segment and the time stamp to combine the data stream segments in sequence according to the mapping relationship table for realizing normal broadcasting of data stream, wherein the first audio source is a teacher user of a teaching activity, a first keynote speaker of an online conference, or a first speaker of an interactive communication activity, wherein the second audio source is a student user of the teaching activity, a second keynote speaker of the online conference, or a second speaker of the interactive communication activity, and wherein the terminal is a mobile terminal or a wired fixed computer terminal, and wherein the network is a wireless or a wired local area network or a wide area network.

2. The method of claim 1, wherein the database is a local server database or an internet server database, and wherein when a data stream is saved to the local server database, the data stream is uploaded to the internet server database by the local server database.

3. The method of claim 2, wherein the data stream is transmitted via Socket communication interface, and is processed with secure sockets layer (SSL) encryption.

4. The method of claim 3, wherein the network teaching includes local network teaching, remote network teaching, local network online conference, remote network online conference, and other network online interaction and communication activities.

5. The method of claim 3, wherein the multimedia whiteboard includes an electronic whiteboard, a touch input device or a handwriting input device on which content can be written and data of the writing motion can be output.

6. The method of claim 3, further comprising acquiring coordinate parameter data of the screen display on the multimedia whiteboard, and saving the coordinate parameter data to the database.

7. The method of claim 6, wherein the motion data includes coordinate position data of written content when writing on the multimedia whiteboard.

8. The method of claim 3, wherein the electronic document includes a WPS document, a WORD document, a PPT document, an EXCEL document, a PDF document, a TXT document or an image document, and wherein the application operation includes opening, closing, page turning, forwarding, reverting of the electronic document and position information of labeling motion on the electronic document by user.

9. The method of claim 8, wherein when executing a first broadcast request and providing server transfers data stream segments to the user terminal according to the time sequence in the mapping relationship table, the user terminal can broadcast the server transfer data stream segments by combing the server transfer data stream segments in sequence without sending the mapping relationship table to the user terminal, wherein when executing the first broadcast request, whether the electronic document has been used will be checked according to the file identity ID of recorded file to be broadcasted, wherein when the electronic document has been used, whether the electronic document has been downloaded will be checked first in local cache of the user terminal, wherein when it is determined that the electronic document has been downloaded, the electronic document is not downloaded again, and wherein when it is determined that the electronic document has not been downloaded, the electronic document is downloaded first to the user terminal via the network.

10. The method of claim 9, wherein the first broadcast request from the network user is sent to a system server through a socket encryption channel, the system server acquires the data stream according to the file identity ID.

11. The method of claim 3, wherein when a data stream is divided into segments and a recorded file cannot be broadcasted without the mapping relationship table, and when the data stream has been saved in the local cache of the network user terminal, the recorded file is restored and broadcasted just by downloading the mapping relationship table.

12. The method of claim 1, wherein the recording and broadcasting network teaching can be applied to the recording and broadcasting of teaching activities or conference process including network teaching, online training, emergency commanding comprising map labeling and audio recording, financial system comprising stock operation explanation or online conference system.

13. A system for recording and broadcasting network teaching, comprising:
   a processor; and
   a computer readable storage medium, having computer readable medium code, when executed, causing the processor to:
   start recording a file;
   create a file identity identifier (ID);
   collect audio data from a first audio source to form a first audio data stream;
   collect audio data from one or more second audio sources to form a second audio data stream;
   collect motion data from a multimedia whiteboard to form a multimedia whiteboard motion data stream;
   collect operation data from at least one screen display to form a screen display operation data stream, the at least one screen display including various application operations on an electronic document displayed on the at least one screen display;
   create a time stamp identity;
   create a set of files by combing and binding the file identity ID and the time stamp identity with the first audio data stream, the second audio data stream, the multimedia whiteboard motion data stream, the screen display operation data stream, and the electronic document;
   store the set of files in a database according to respective formats;
   acquire the first audio data stream, the second audio data stream, the multimedia whiteboard motion data stream, and the screen display operation data stream via internet respectively by a user terminal;
   broadcast recorded content according to time stamp identity with client installed on the user terminal following the acquiring;
   divide at least one type of the first audio data stream, the second audio data stream, the multimedia whiteboard motion data stream, and the screen display operation data stream into segments, wherein the identity ID of every data stream segment is composed of the file identity ID and segment code randomly assigned; and
   establish a mapping relationship table between the identity ID of the data stream segment and the time stamp to combine the data stream segments in sequence according to the mapping relationship table for realizing normal broadcasting of data stream,
   wherein the first audio source is a teacher user of a teaching activity, a first keynote speaker of an online conference, or a first speaker of an interactive communication activity,
   wherein the second audio source is a student user of the teaching activity, a second keynote speaker of the online conference, or a second speaker of the interactive communication activity, and
   wherein the terminal is a mobile terminal or a wired fixed computer terminal, and wherein the network is a wireless or a wired local area network or a wide area network.

14. The system of claim 13, wherein the database is a local server database or an internet server database, and wherein when a data stream is saved to the local server database, the data stream is uploaded to the internet server database by the local server database.

15. The system of claim 14, wherein the data stream is transmitted via Socket communication interface, and is processed with secure sockets layer (SSL) encryption.

16. The system of claim 15, wherein the network teaching includes local network teaching, remote network teaching, local network online conference, remote network online conference, and other network online interaction and communication activities.

17. The system of claim 15, wherein the multimedia whiteboard includes an electronic whiteboard, a touch input device or a handwriting input device on which content can be written and data of the writing motion can be output.

18. The system of claim 15, wherein the computer readable storage medium comprises the computer readable medium code, when executed, further causing the processor to acquire coordinate parameter data of the screen display on the multimedia whiteboard, and saving the coordinate parameter data to the database.

19. The system of claim 18, wherein the motion data includes coordinate position data of written content when writing on the multimedia whiteboard.

20. The system of claim 15, wherein the electronic document includes a WPS document, a WORD document, a PPT document, an EXCEL document, a PDF document, a TXT document or an image document, and wherein the application operation includes opening, closing, page turning, forwarding, reverting of the electronic document and position information of labeling motion on the electronic document by user.

21. The system of claim 20, wherein when executing a first broadcast request and providing server transfers data stream segments to the user terminal according to the time sequence in the mapping relationship table, the user terminal can broadcast the server transfer data stream segments by combing the server transfer data stream segments in sequence without sending the mapping relationship table to the user terminal, wherein when executing the first broadcast request, whether the electronic document has been used will be checked according to the file identity ID of recorded file to be broadcasted, wherein when the electronic document has been used, whether the electronic document has been downloaded will be checked first in local cache of the user terminal, wherein when it is determined that the electronic document has been downloaded, the electronic document is not downloaded again, and wherein when it is determined that the electronic document has not been downloaded, the electronic document is downloaded first to the user terminal via the network.

22. The system of claim 21, wherein the first broadcast request from the network user is sent to a system server through a socket encryption channel, the system server acquires the data stream according to the file identity ID.

23. The system of claim 15, wherein when a data stream is divided into segments and a recorded file cannot be broadcasted without the mapping relationship table, and when the data stream has been saved in the local cache of the network user terminal, the recorded file is restored and broadcasted just by downloading the mapping relationship table.

24. The system of claim 13, wherein the recording and broadcasting network teaching can be applied to the recording and broadcasting of teaching activities or conference process including network teaching, online training, emergency commanding comprising map labeling and audio recording, financial system comprising stock operation explanation or online conference system.

25. A machine-readable tangible and non-transitory medium having information, wherein the information, when read by a hardware processor system, causes the hardware processor system to:
   start recording a file;
   create a file identity identifier (ID);
   collect audio data from a first audio source to form a first audio data stream;
   collect audio data from one or more second audio sources to form a second audio data stream;
   collect motion data from a multimedia whiteboard to form a multimedia whiteboard motion data stream;
   collect operation data from at least one screen display to form a screen display operation data stream, the at least one screen display including various application operations on an electronic document displayed on the at least one screen display;
   create a time stamp identity;
   create a set of files by combing and binding the file identity ID and the time stamp identity with the first audio data stream, the second audio data stream, the multimedia whiteboard motion data stream, the screen display operation data stream, and the electronic document;
   store the set of files in a database according to respective formats;
   acquire the first audio data stream, the second audio data stream, the multimedia whiteboard motion data stream, and the screen display operation data stream via internet respectively by a user terminal;
   broadcast recorded content according to time stamp identity with client installed on the user terminal following the acquiring;
   divide at least one type of the first audio data stream, the second audio data stream, the multimedia whiteboard motion data stream, and the screen display operation data stream into segments, wherein the identity ID of every data stream segment is composed of the file identity ID and segment code randomly assigned; and
   establish a mapping relationship table between the identity ID of the data stream segment and the time stamp to combine the data stream segments in sequence according to the mapping relationship table for realizing normal broadcasting of data stream,
   wherein the first audio source is a teacher user of a teaching activity, a first keynote speaker of an online conference, or a first speaker of an interactive communication activity,
   wherein the second audio source is a student user of the teaching activity, a second keynote speaker of the online conference, or a second speaker of the interactive communication activity, and
   wherein the terminal is a mobile terminal or a wired fixed computer terminal, and wherein the network is a wireless or a wired local area network or a wide area network.

26. The machine-readable tangible and non-transitory medium of claim 25, wherein the database is a local server database or an internet server database, and wherein when a data stream is saved to the local server database, the data stream is uploaded to the internet server database by the local server database.

\* \* \* \* \*